United States Patent [19]

DeYoung

[11] Patent Number: 4,873,539

[45] **Date of Patent: * Oct. 10, 1989**

[54] PHASE CHANGE INK JET APPARATUS

[75] Inventor: Thomas W. DeYoung, Stormville, N.Y.

[73] Assignee: Dataproducts Corporation, Woodland Hills, Calif.

[ * ] Notice: The portion of the term of this patent subsequent to Aug. 19, 2003 has been disclaimed.

[21] Appl. No.: 224,260

[22] Filed: Jul. 26, 1988

Related U.S. Application Data

[63] Continuation of Ser. No. 913,547, Sep. 26, 1986, abandoned, which is a continuation of Ser. No. 661,924, Oct. 16, 1984, abandoned.

[51] Int. Cl.[4] .............................................. G01D 15/16

[52] U.S. Cl. .................................. 346/140 R; 346/1.1

[58] Field of Search ................ 346/1.1, 140 R, 140 IJ, 346/140 PD; 400/126; 219/421; 137/341

[56] References Cited

U.S. PATENT DOCUMENTS

| | | | |
|---|---|---|---|
| 3,585,361 | 6/1971 | Rosen et al. | 219/421 |
| 4,607,266 | 8/1986 | DeBonte | 346/140 PD |

FOREIGN PATENT DOCUMENTS

| | | |
|---|---|---|
| 0097823 | 1/1984 | European Pat. Off. . |
| 54368 | 4/1980 | Japan . |

*Primary Examiner*—E. A. Goldberg

*Assistant Examiner*—Mark Reinhart

*Attorney, Agent, or Firm*—Woodcock Washburn Kurtz Mackiewica & Norris

[57] ABSTRACT

In order to minimize the effects of heating on performance and reliability in a phase change ink jet system, the ink jets comprise a material having a thermal conductivity of at least 0.03 g cal/sec cm$^2$ (°C./cm). The material may comprise stainless steel or aluminum. The reservoir of the system comprises the same material.

18 Claims, 1 Drawing Sheet

PHASE CHANGE INK JET APPARATUS

This is a continuation of application Ser. No. 913,547, filed Sept. 26, 1986, which is a continuation of Ser. No. 661,924, filed Oct. 16, 1984.

BACKGROUND OF THE INVENTION

This invention relates to an ink jet wherein the ink employed within the jet is of the phase change type, which may be referred to as hot melt ink.

The phase change, or hot melt ink, of the type utilized in an ink jet is characteristically solid at room temperature. When heated, the ink will melt to a consistency so as to be jettable. A hot melt ink jet apparatus and method of operation are disclosed in copending application Ser. No. 610,627, filed May 16, 1984 now U.S. Pat. No. 4,390,369.

It has been found that improper heating may degrade the ink and thus the performance of an ink jet. In order to avoid such degradation by extended heating, copending application Ser. No. 661,029, filed Oct. 15, 1984, now U.S. Pat. No. 4,607,266, discloses a method and apparatus whereby the reservoir is allowed to cool during standby and only the head is heated, thereby limiting the amount of ink heated and minimizing degradation of the ink with its adverse affects on performance.

It has also been found that extremely high, localized temperatures in an ink jet apparatus can subject the localized ink to undesirable conditions which will result in localized ink degradation which, of course, can also affect performance. Moreover, temperature gradients, i.e., variations in temperatures from one location to another location, in the ink jet apparatus can adversely affect performance of the ink jet. In addition to degrading performance, the above-discussed temperature effects can adversely affect reliability.

SUMMARY OF THE INVENTION

It is an object of this invention to minimize the affects of heating on performance and reliability in a phase change ink jet system.

It is a further object of this invention to provide a high degree of reliability in a phase change ink jet system.

It is a more specific object of this invention to minimize temperature gradients in such an ink jet system, including localized hot spots.

It is a further object of this invention to provide an ink jet system of the phase change type which may be allowed to cool in the standby mode and be rapidly brought up to the desired operating temperature.

It is a still further object of this invention to provide an ink jet system of the phase change type comprising a material which will not adversely react with the ink contained within the system.

It is a still further object of this invention to minimize the weight associated with the ink jet system, thereby permitting rapid movement of an ink jet relative to a surface being scanned.

In accordance with these and other objects of the invention, an ink jet apparatus for ejecting droplets of ink comprises at least one ink jet including a chamber, an orifice and an inlet. Heater means are coupled to the ink jet for heating the ink so as to undergo a phase change from a solid state to a liquid state. In accordance with this invention, the ink jet comprises a material having a thermal conductivity of at least 0.03 g cal/sec $cm^2$(°C./cm). Preferably, the material has a thermal conductivity of at least 0.2 g cal/sec $cm^2$(°C./cm).

In accordance with this invention, a plurality of highly thermally conductive materials may be utilized including stainless steel, although aluminum is preferred.

In further accordance with the object of this invention, the apparatus comprises a reservoir which is also coupled to the heater means. The reservoir also comprises a material having a thermal conductivity of at least 0.03 g cal/sec $cm^2$(°C./cm) and preferably more than 0.2 g cal/sec $cm^2$(°C./cm).

DETAILED DESCRIPTION OF A PREFERRED EMBODIMENT

Figure 1:
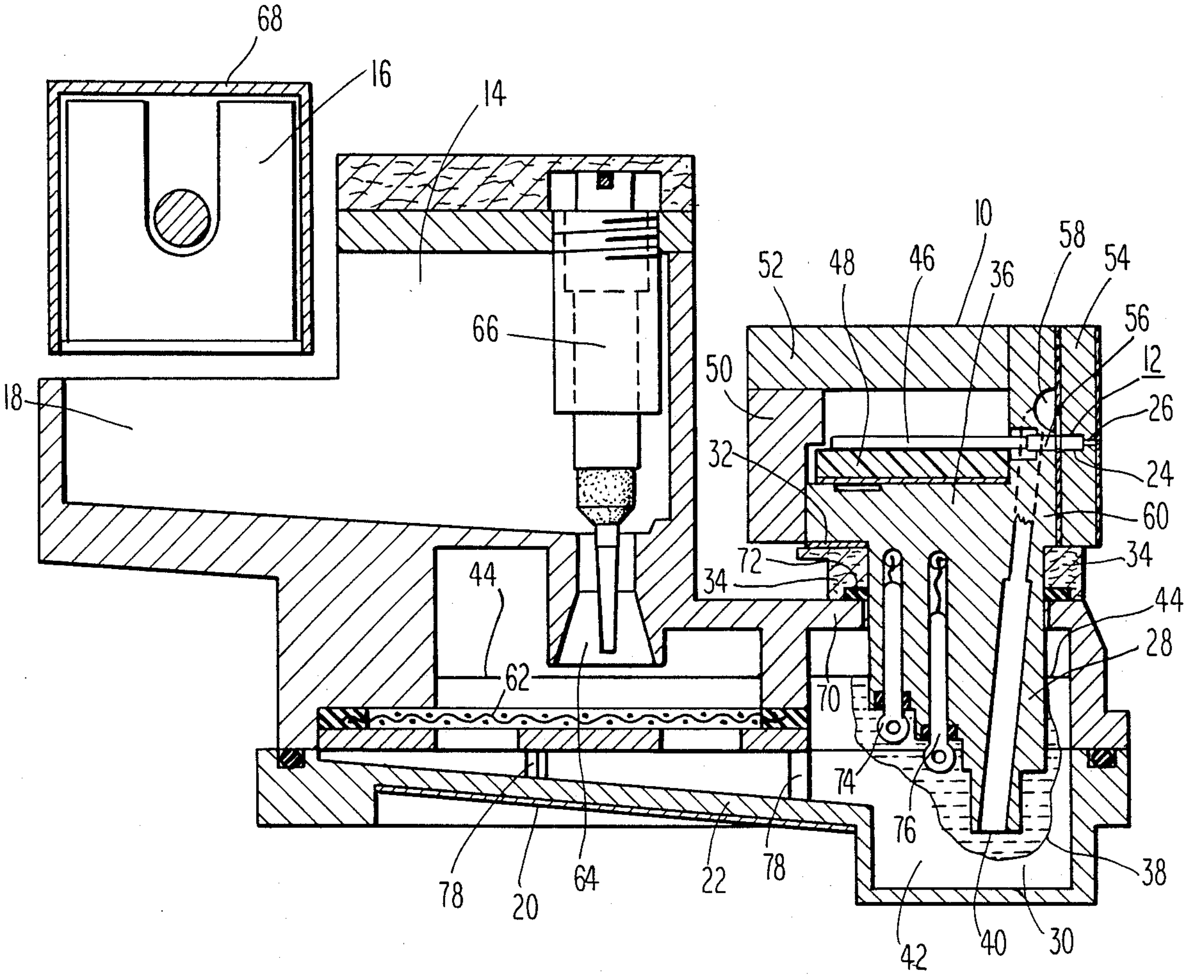
FIG. 1 is a sectional view of an ink jet system embodying this invention.

Referring to FIG. 1, an ink jet apparatus comprises an imaging head 10 including at least one ink jet 12 and a reservoir 14. The ink jet apparatus is adapted to jet droplets of hot melt or phase change ink. In accordance with this invention, substantially all of the imaging head 10 and the reservoir 14 in contact with the melted ink comprises a highly thermally conductive material so as to minimize temperature gradients and thereby avoid degradation of the ink and assure high performance and reliability of the ink jet apparatus.

As shown in FIG. 1, a block of solid state ink 16 is juxtaposed to an opening in a trough 18. When the pellet 16 drops into the the trough 18, the pellet 16 proceeds to melt in response to heat generated by a heater 20 located at the base of the reservoir 14 below a sloping surface 22.

As shown in FIG. 1, the ink jet 12 includes a chamber 24 having an orifice 26 for ejecting droplets of ink and an inlet 28 extending to the lowermost extremity 30 of the reservoir 14 adjacent the sloping bottom 22.

In accordance with the invention of the aforesaid copending application Ser. No. 661,029, filed Oct. 15, 1984, which is assigned to the assignee of this invention and incorporated herein by reference, the head 10 is provided with an independent heater 32 located between a thermal resistance barrier 34 comprising insulation and a head member 36. By providing the heater 32 which is independent of the heater 20, it is possible to maintain the head 10 at a different temperature from the reservoir 14. This allows the reservoir 14 and the ink within the reservoir to be cooled in the standby mode thereby avoiding cooking of and resulting degradation of a large volume of ink while at the same time maintaining the ink within the imaging head 10 in a liquid state so as to prevent depriming.

With respect to the prevention of depriming, it will be appreciated that inlet 28 passes through the head member 36 which is highly conductive such that heat is conducted to the end 40 which maintains a pool of ink 38 in the liquid state in the immediate vicinity of the end 40 while the remainder of the ink within the reservoir 14 is able to cool to the solid state when the system is in a standby mode. As shown in FIG. 1, the pool 38 of liquid ink is maintained in an otherwise solid state mass 42 of ink extending up to a level 44.

As also shown in FIG. 1, a transducer 46 is juxtaposed to the end of the chamber 24. The transducer which is provided with electrodes is energized by a signal provided through a printed circuit board 48 located above the member 36. The transducer 46 and the printed circuit board 48 are then housed within head members 50 and 52.

As also shown in FIG. 1, the head includes a chamber plate 54 forming the chamber 24, which is in communication with a foot 56 located at the end of the transducer 46. As the transducer changes state in response to signals applied, the position of the foot 56 varies so as to expand and compress the volume within the chamber 24. The inlet 28 supplies a manifold 58 located in a plate 60 which is coupled to restricted inlets to the jet 12. Actually, the manifold 58 serves a plurality of restricted inlets in an array of ink jets identical to the jet 12 shown in FIG. 1. Further details concerning the nature of the ink jet 12 and other jets in the array including the configuration of the manifold 28 are disclosed in copending application Ser. No. 661,794, filed Oct. 17, 1984, which is assigned to the assignee of this invention and incorporated herein by reference.

The reservoir 14 as shown in FIG. 1 also includes a filter 62 which is located below a port 64 which is adapted to be opened and closed by a needle valve 66. The needle valve 66 is employed to close the port 64 during the priming as disclosed in copending application Ser. No. 661,925, filed Oct. 16, 1984, which is assigned to the assignee of this invention and incorporated herein by reference. Ink is delivered to the reservoir 14 by means of a cartridge 68 as disclosed in copending application Ser. No. 661,922, filed Oct. 16, 1984, which is assigned to the assignee of this invention and incorporated herein by reference.

As also shown in FIG. 1, the insulating barrier 34 which provides a high thermal resistance path is sealed against portion 70 of the reservoir 14, using an O-ring 72 which is also characterized by adequate insulating properties. Preferably, the member 36 which extends down into the reservoir 14 toward the lowermost portion 30 is slightly spaced from portion 70 of the reservoir 14. This spacing assures an adequate thermal barrier and high thermal resistance path so as to permit independent heating of the ink within the head as compared to the heat within the reservoir 14.

Finally, FIG. 1 shows redundant level sensing elements 74 and 76, which may comprise RF level sensing or other electrical sensor means. Baffles 78 are also provided in the reservoir 14 as disclosed in the aforesaid copending application Ser. No. 661,925, filed Oct. 16, 1984, which is incorporated herein by reference.

As stated in the foregoing, it is preferred that the head 10 as well as the reservoir 14 have a thermal conductivity in excess of 0.03 g cal/sec cm$^2$(°C./cm). Preferably, the thermal conductivity of the head 10 and the reservoir 14 is in excess of 0.2 g cal/sec cm$^2$(°C./cm). In this connection, it is preferred to utilize aluminum although stainless steel may be utilized as well as other materials having similar conductivities, e.g., metallic and plastic composites.

Various materials suitable for use are set forth in the following table:

| MATERIAL | THERMAL CONDUCTIVITIES g cal/sec cm$^2$ (°C./cm) |
|---|---|
| Copper | 0.92 |
| Aluminum - 99% | 0.50 |
| Aluminum 7075 | 0.289 |
| Aluminum 6061 | 0.409 |
| Aluminum 356 | 0.36–0.40 |

-continued

| MATERIAL | THERMAL CONDUCTIVITIES g cal/sec cm$^2$ (°C./cm) |
|---|---|
| Aluminum A13 | 0.29 |
| Aluminum 380 | 0.23–0.26 |
| Brass | 0.25–0.31 |
| 400 Series Stainless Steel (420) | .0595 |
| 300 Series Stainless Steel (316) | .0389 |

Where the preferred material of aluminum is utilized, the advantages associated with high thermal conductivity so as to minimize temperature gradients and hot spots is achieved as well as rapid heating to the desired operating temperature. In addition, aluminum by virtue of its relatively low density provides a relatively lightweight imaging head 10 and reservoir 14 so as to minimize the inertia of the head 10 and the reservoir 14, thereby permitting rapid movement of the jet with respect to a surface being scanned. Moreover, aluminum will not chemically react with the ink.

Of course, it is clear that the entire imaging head 10 and entire reservoir 14 does not comprise the high thermal conductivity material. For example, thermal resistance barrier 34 may comprise a material having a thermal conductivity less than 0.005 g cal/sec cm$^3$(°C./cm). The thermal barrier may also be achieved without benefit of insulation by minimizing the metal contact between the head 10 and the reservoir 14. However, substantially all of the head 10 and the reservoir 14 which is in direct or indirect contact with the ink does comprise the high thermal conductivity material, a notable exception including the filter 62. Indirect contact is achieved where the material such as copper is coated so as to minimize any reaction with the ink. It is also possible to utilize more than one high thermal conductivity material in the ink jet apparatus. For example, it may be possible to make a portion of the head 10 from aluminum with a portion or all of the reservoir 14 comprises stainless steel.

The preferred embodiment of the invention may utilize ink as disclosed in U.S. Pat. No. 4,390,369 and pending U.S. applications Ser. No. 610,627, filed May 16, 1984, Ser. No. 565,124, filed Dec. 23, 1983 and Ser. no. 644,542, filed Aug. 27, 1984, all of which are assigned to the assignee of this invention and incorporated herein by reference.

Although a preferred embodiment of the invention has been shown and described including various materials, other embodiments will occur to those of ordinary skill in the art which will fall within the true spirit and scope of the appended claims.

I claim:

1. Hot-melt ink jet printing apparatus for ejecting droplets of phase change ink comprising:
   - an imaging head having at least one ink jet including a chamber, an orifice and an inlet;
   - a reservoir containing a supply of the phase change ink, said reservoir coupled to the inlet of said at least one ink jet;
   - first heater means for heating ink in said jet so as to undergo a phase change from a solid state to a liquid state without degrading the ink;
   - second heater means for heating ink in said reservoir so as to undergo a phase change from a solid state to a liquid state without degrading the ink;

thermal resistance barrier means between said imaging head and said reservoir, whereby said first heater means is adapted to be controlled independently of said second heater means, thereby enabling said imaging head to be maintained at a different temperature than said reservoir;

said jet comprising a material having a thermal conductivity of at least 0.03 g cal/sec $cm^2$ (°C./cm).

2. The apparatus of claim 1 wherein said material has a thermal conductivity of at least 0.2 g cal/sec $cm^2$(°C./cm).

3. The apparatus of claim 1 wherein said material comprises stainless steel.

4. The apparatus of claim 1 wherein said material comprises aluminum.

5. The apparatus of claim 1 wherein said reservoir also comprises a material having a thermal conductivity of at least 0.03 g cal/sec $cm^2$(°C./cm).

6. The apparatus of claim 5 wherein said material has a thermal conductivity of at least 0.2 g cal/sec $cm^2$(°C./cm).

7. The apparatus of claim 5 wherein said material comprises stainless steel.

8. The apparatus of claim 5 wherein said material comprises aluminum.

9. The apparatus of claim 5 wherein substantially all of the material of said ink jet and said reservoir in contact with the ink has a thermal conductivity of at least 0.03 g cal/sec $cm^2$(°C./cm).

10. Hot-melt ink jet printing apparatus for ejecting droplets of phase change ink comprising:

an ink jet head including a plurality of ink jets, each of said jets including a chamber, an orifice and an inlet;

a reservoir containing a supply of the phase change ink, said reservoir coupled to the inlet of each said jet;

first heater means for heating ink in said head so as to undergo a phase change from a solid state to a liquid state without degrading the ink;

second heater means for heating ink in said reservoir so as to undergo a phase change from a solid state to a liquid state without degrading the ink;

thermal resistance barrier means between said ink jet head and said reservoir, whereby said first heater means is adapted to be controlled independently of said second heater means, thereby enabling said ink jet head to be maintained at a different temperature than said reservoir;

said jets comprising a material having a thermal conductivity of at least 0.03 g cal/sec $cm^2$ (°C./cm).

11. The apparatus of claim 10 wherein said material has a thermal conductivity of at least 0.2 g cal/sec $cm^2$(°C./cm).

12. The apparatus of claim 10 wherein said material comprises stainless steel.

13. The apparatus of claim 10 wherein said material comprises aluminum.

14. The apparatus of claim 10 wherein said reservoir also comprises a material having a thermal conductivity of at least 0.03 g cal/sec $cm^2$(°C./cm).

15. The apparatus of claim 14 wherein said material has a thermal conductivity of at least 0.2 g cal/sec $cm^2$(°C./cm).

16. The apparatus of claim 14 wherein said material comprises stainless steel.

17. The apparatus of claim 14 wherein said material comprises aluminum.

18. The apparatus of claim 14 wherein substantially all of the material of said head and said reservoir in contact with the ink has a thermal conductivity of at least 0.03 g cal/sec $cm^2$(°C./cm).

* * * * *

UNITED STATES PATENT AND TRADEMARK OFFICE

CERTIFICATE OF CORRECTION

PATENT NO. : 4,873,539

DATED : October 10, 1989

INVENTOR(S) : DeYoung

It is certified that error appears in the above-identified patent and that said Letters Patent is hereby corrected as shown below:

Column 2, line 59 please change the number "40" to --38--.

Column 2, line 60, please change the number "38" to --40--.

Column 2, line 61, please change the number "40" to --38--.

Column 2, line 63, please change the number "38" to --40--.

Signed and Sealed this

Twentieth Day of November, 1990

Attest:

HARRY F. MANBECK, JR.

*Attesting Officer*

*Commissioner of Patents and Trademarks*